United States Patent
Zheng et al.

(10) Patent No.: US 12,290,062 B2
(45) Date of Patent: ***May 6, 2025

(54) PORTABLE MOSQUITO KILLING LAMP

(71) Applicant: NINGBO DAYANG TECHNOLOGY CO., LTD., Zhejiang (CN)

(72) Inventors: Jun Zheng, Zhejiang (CN); Yuanai Ning, Zhejiang (CN)

(73) Assignee: NINGBO DAYANG TECHNOLOGY CO., LTD., Ningbo (CN)

( * ) Notice: Subject to any disclaimer, the term of this patent is extended or adjusted under 35 U.S.C. 154(b) by 75 days.

This patent is subject to a terminal disclaimer.

(21) Appl. No.: 18/113,621

(22) Filed: Feb. 24, 2023

(65) Prior Publication Data

US 2023/0292731 A1   Sep. 21, 2023

(30) Foreign Application Priority Data

Mar. 21, 2022 (CN) .......................... 202220621806.2

(51) Int. Cl.
*A01M 1/22*   (2006.01)
*A01M 1/04*   (2006.01)

(52) U.S. Cl.
CPC .............. *A01M 1/223* (2013.01); *A01M 1/04* (2013.01)

(58) Field of Classification Search
CPC .......... A01M 1/04; A01M 1/223; A01M 1/08; A01M 1/22; F21K 9/232; F21V 3/049; F21V 33/0044
USPC ................................................... 43/112, 113
See application file for complete search history.

(56) References Cited

U.S. PATENT DOCUMENTS

| | | | | |
|---|---|---|---|---|
| 2,061,458 A | * | 11/1936 | Folmer .................... | A01M 1/04 43/112 |
| 2,092,136 A | * | 9/1937 | Plym ....................... | A01M 1/04 43/112 |
| 2,132,371 A | * | 10/1938 | Kriwat .................... | A01M 1/02 43/112 |
| 2,198,807 A | * | 4/1940 | Eshbaugh ............... | A01M 1/04 362/253 |
| 4,226,043 A | * | 10/1980 | Peterson ................ | A01M 1/223 43/112 |
| 4,654,998 A | * | 4/1987 | Clay ....................... | A01M 1/145 43/115 |
| 4,785,573 A | * | 11/1988 | Millard ................... | A01M 1/04 362/179 |
| 5,184,417 A | * | 2/1993 | Weldon ................... | A01M 1/106 43/107 |
| 5,301,458 A | * | 4/1994 | Deyoreo .................. | A01M 1/04 43/112 |
| 6,134,826 A | * | 10/2000 | Mah ........................ | A01M 1/223 43/99 |

(Continued)

FOREIGN PATENT DOCUMENTS

CN          109169569 A  *  1/2019  .............. A01M 1/04

*Primary Examiner* — Tye William Abell
*Assistant Examiner* — Maria E Graber (57) ABSTRACT

A portable mosquito killing lamp includes a housing and a lamp cover connected to the housing; a mosquito killing assembly and a light emitting assembly are arranged on the housing; the light emitting assembly includes an illuminant and a dazzling cover, and the illuminant and the dazzling cover are connected to the housing and are disposed between the housing and the lamp cover; the dazzling cover covers the illuminant and is disposed inside the lamp cover.

15 Claims, 8 Drawing Sheets

(56) References Cited

U.S. PATENT DOCUMENTS

| | | | | |
|---|---|---|---|---|
| 8,028,467 B2 * | 10/2011 | Bagnall | | A01M 1/106 43/107 |
| 8,390,182 B2 * | 3/2013 | Yu | | F21V 3/02 362/625 |
| 9,028,103 B2 * | 5/2015 | Lee | | F21K 9/232 362/294 |
| 9,657,928 B1 * | 5/2017 | Jacobson | | H05B 47/19 |
| 10,045,521 B2 * | 8/2018 | Zheng | | A01M 1/04 |
| D899,556 S * | 10/2020 | Du | | A01M 1/223 D22/123 |
| 10,905,111 B2 * | 2/2021 | Zhang | | F04D 29/644 |
| 11,064,688 B2 * | 7/2021 | Billingsley, Jr. | | H05B 47/195 |
| 11,771,073 B2 * | 10/2023 | Smith | | H05B 47/125 43/132.1 |
| 11,796,137 B1 * | 10/2023 | Bai | | F21V 29/83 |
| 11,920,742 B1 * | 3/2024 | Zou | | F21K 9/232 |
| 2004/0159040 A1 * | 8/2004 | Chen | | A01M 1/223 43/112 |
| 2005/0174769 A1 * | 8/2005 | Yong | | F21K 9/232 362/249.05 |
| 2009/0100743 A1 * | 4/2009 | Prater | | A01M 1/223 43/112 |
| 2010/0071254 A1 * | 3/2010 | Calkins | | A01M 1/145 43/107 |
| 2010/0124061 A1 * | 5/2010 | Yen | | F21K 9/232 362/253 |
| 2012/0049732 A1 * | 3/2012 | Chuang | | F21V 29/83 315/32 |
| 2012/0218756 A1 * | 8/2012 | Bertram | | F21K 9/60 362/249.02 |
| 2014/0146570 A1 * | 5/2014 | Lu | | F21K 9/232 362/647 |
| 2014/0352200 A1 * | 12/2014 | Tremble | | A01M 1/223 43/112 |
| 2014/0355276 A1 * | 12/2014 | Fisher | | F21K 9/232 362/382 |
| 2016/0037602 A1 * | 2/2016 | Nicholls | | F21K 9/232 307/64 |
| 2018/0199563 A1 * | 7/2018 | Zheng | | A01M 1/106 |
| 2020/0107534 A1 * | 4/2020 | Zheng | | A01M 1/08 |
| 2021/0153493 A1 * | 5/2021 | Zhang | | A01M 1/08 |
| 2022/0248654 A1 * | 8/2022 | Howland | | A01M 1/08 |
| 2023/0292728 A1 * | 9/2023 | Zheng | | A01M 1/04 43/112 |
| 2023/0292731 A1 * | 9/2023 | Zheng | | F21V 3/049 43/112 |
| 2023/0309538 A1 * | 10/2023 | Marcucci | | A01M 1/223 43/114 |

* cited by examiner

PORTABLE MOSQUITO KILLING LAMP

CROSS-REFERENCE TO RELATED APPLICATIONS

The present disclosure claims priority of Chinese Utility Model Application No. 202220621806. 2, filed on Mar. 21, 2022, the entire contents of which are hereby incorporated by reference.

TECHNICAL FIELD

The disclosure relates to the technical field of lamps, and more particularly to a portable mosquito killing lamp.

DESCRIPTION OF THE PRIOR ART

Due to insects, mosquitoes and other flying insects' phototaxis, the flying insects tend to congregate the place where there is light. To avoid mosquito bites and clumping of flying insects, various mosquito killing fixtures have been developed. For example, portable mosquito killing lamps, and the like. The portable mosquito killing lamp is convenient to carry and can be used not only indoors, but also outdoors when people travel out or are in field trip activities. However, the portable mosquito killing lamps in the prior art are simple in construction and have a single function, which cannot meet the needs of modern people.

SUMMARY OF THE DISCLOSURE

The technical problem to be solved by the present disclosure is to provide a portable mosquito killing lamp having a recreational function in addition to functions of lighting and mosquito killing, which meets the needs of modern people.

A technical solution of the present disclosure is to provide a portable mosquito killing lamp having a following structure. The portable mosquito killing lamp includes a housing and a lamp cover connected to the housing, a mosquito killing assembly and a light emitting assembly are arranged on the housing, the light emitting assembly includes an illuminant and a dazzling cover, the illuminant and the dazzling cover are connected to the housing and are disposed between the housing and the lamp cover, and the dazzling cover covers the illuminant and is disposed inside the lamp cover.

Compared to the prior art, the portable mosquito killing lamp having the above structure of the preset disclosure, has the following advantages that:

The inside of the lamp cover of the portable mosquito killing lamp of the preset disclosure is provided with the dazzling cover, and the light emitted by the illuminant is refracted by the dazzling cover to produce a dazzling effect, such that the portable mosquito killing lamp has not only functions of lighting and mosquito killing, but also function of recreation, which meets the needs of modern people.

As a development, the dazzling cover is provided with a pattern producing a dazzling effect. With such a configuration, the dazzling cover has simple structure and results in a better dazzling effect.

As a development, the pattern is formed by a plurality of polygonal patterns connected one another. With such a configuration, the dazzling cover has simple structure and results in a more uniform dazzling effect.

As a development, the pattern is disposed on an inner surface of the dazzling cover and an outer surface of the dazzling cover is smooth. With such a configuration, the light emitted from the dazzling cover is more uniform.

As a development, a connecting base is arranged on the housing, the illuminant is mounted on the connecting base, an actuator is further mounted on the connecting base, the dazzling cover is connected to a torque output shaft of the actuator; the illuminant and the actuator are accommodated within a receiving space formed between the connecting base and the lamp cover. With such a configuration, the actuator may drive the dazzling cover to rotate, which makes a dazzling light have a better flexibility and a better dazzling effect.

As a development, the connecting base is provided with a mounting groove, and the actuator is embedded in the mounting groove; the illuminant covers an opening of the mounting groove, and the torque output shaft passes through the illuminant and is exposed out of the illuminant; a central portion of the dazzling cover is fixedly connected to an end portion of the torque output shaft and the dazzling cover covers the connecting base. With such a configuration, the actuator has a more stable mounting structure, is simple in structure and easier to be assembled.

As a development, a bottom of the mounting groove is provided with a mounting hole, an internal cavity of the mounting groove communicates with an internal cavity of the housing; a step is disposed on a sidewall of the actuator, an end portion of the actuator extends through the mounting hole into the housing, a step surface of the step abuts against the bottom of the mounting groove. With such a configuration, the end portion of the actuator extends through the mounting hole into the housing to facilitate a wiring of the actuator, resulting in simple structure and convenient assembly.

As a development, the connecting base is provided with at least two connecting columns, the actuator is provided with fitting holes a number of which is the same as a number of the connecting columns, and the actuator is mounted around the connecting columns; and the illuminant presses on an outside of the actuator and the illuminant is fixedly connected to the connecting columns. With such a configuration, the actuator has simple assembly structure and is convenient to be assembled.

As a development, the mounting groove is eccentrically disposed on the connecting base; the torque output shaft is eccentrically disposed on the actuator; and the torque output shaft is mounted coaxially with the connecting base. With such a configuration, the installation of the actuator is allowed to make a reasonable space utilization, resulting in a more compact finishing structure.

As a development, the actuator is provided with a shaft sleeve, the torque output shaft passes through the shaft sleeve and is exposed out of the actuator; a central part of a substrate of the illuminant is provided with a central hole, and the substrate surrounds the shaft sleeve. With such a configuration, the substrate and the actuator have a simpler mating structure and a more reliable connection.

As a development, the illuminant further includes a plurality of light emitting members, the substrate is provided with a lighting control circuit, the plurality of light emitting members are annularly arranged at a periphery of the substrate, the light emitting members are electrically connected to the lighting control circuit. With such a configuration, the light emitting members can emit more uniform light, have a greater range of illumination, and can produce a better dazzling effect.

As a development, the mosquito killing assembly is accommodated within a receiving space formed between the connecting base and the housing; a plurality of through holes are disposed on a sidewall of the housing, the through holes communicate with an internal cavity of the housing; a supporting column and a control board are disposed in the housing; the mosquito killing assembly comprises a electrical mesh wrapped around the supporting column, and the electrical mesh is electrically connected to the control board. With such a configuration, the mosquito killing assembly is mounted within the housing, such structure is more properly designed and the grid has better mosquito killing effect.

As a development, the supporting column is fixedly connected to the housing, the connecting base is fixedly connected to an end portion of the supporting column; and the control board is mounted between the connecting base and the supporting column. Such a configuration is designed more rationally and is helpful for circuit connection.

As a development, the mosquito killing assembly includes a mosquito attracting lamp disposed within the supporting column, the mosquito attracting lamp is electrically connected to the control board; and the supporting columns is made of a transparent material. Such a configuration further has a mosquito attracting effect from the mosquito attracting lamp, such that the mosquito killing assembly is more effective in mosquito eradicating.

As a development, a retaining ring is mounted around an open end of the lamp cover, an end portion of the lamp cover is limited within the retaining ring, and the retaining ring is connected to an end portion of the housing. With such a configuration, the lamp cover has a simple mounting structure and is easy to be assembled.

The reference numbers shown in the figures are: 1 housing, 101 through hole, 2 lamp cover, 3 hanging ring, 4 dazzling cover, 401 polygonal pattern, 5 actuator, 501 motor, 502 gear box, 503 shaft sleeve, 504 step, 505 lug, 506 fitting hole, 507 torque output shaft, 6 substrate, 601 central hole, 602 first connecting hole, 7 light emitting member, 8 connecting base, 801 mounting groove, 802 mounting hole, 803 connecting column, 9 mosquito attracting lamp, 10 supporting column, 1001 rib 1002 groove, 11 annular supporting plate, 12 control board, 13 first sealing ring, 14 second sealing ring, 15 switch, 1501 button, 16 retaining ring, 17 electrical mesh, 603 lighting control circuit.

DESCRIPTION OF EMBODIMENTS

For a better understanding of the present disclosure, various aspects of the present disclosure will be explained in more detail with reference to the accompanying drawings. It is to be understood that these detailed descriptions are only illustrative of exemplary embodiments of the present disclosure and are not intended to limit the scope of the present disclosure in any way. The reference numerals refer to the same elements throughout the description.

In the drawings, the thickness, size, and shape of objects have been slightly enlarged for ease of illustration. The drawings are merely examples and are not drawn strictly to scale.

It will be further understood that the terms "includes," "including," "having," "comprises," and/or "comprising," when used in this specification, specify the presence of stated features, integers, steps, operations, elements, and/or components, but do not exclude the presence or addition of one or more other features, integers, steps, operations, elements, components, and/or combination thereof.

Figure 1:
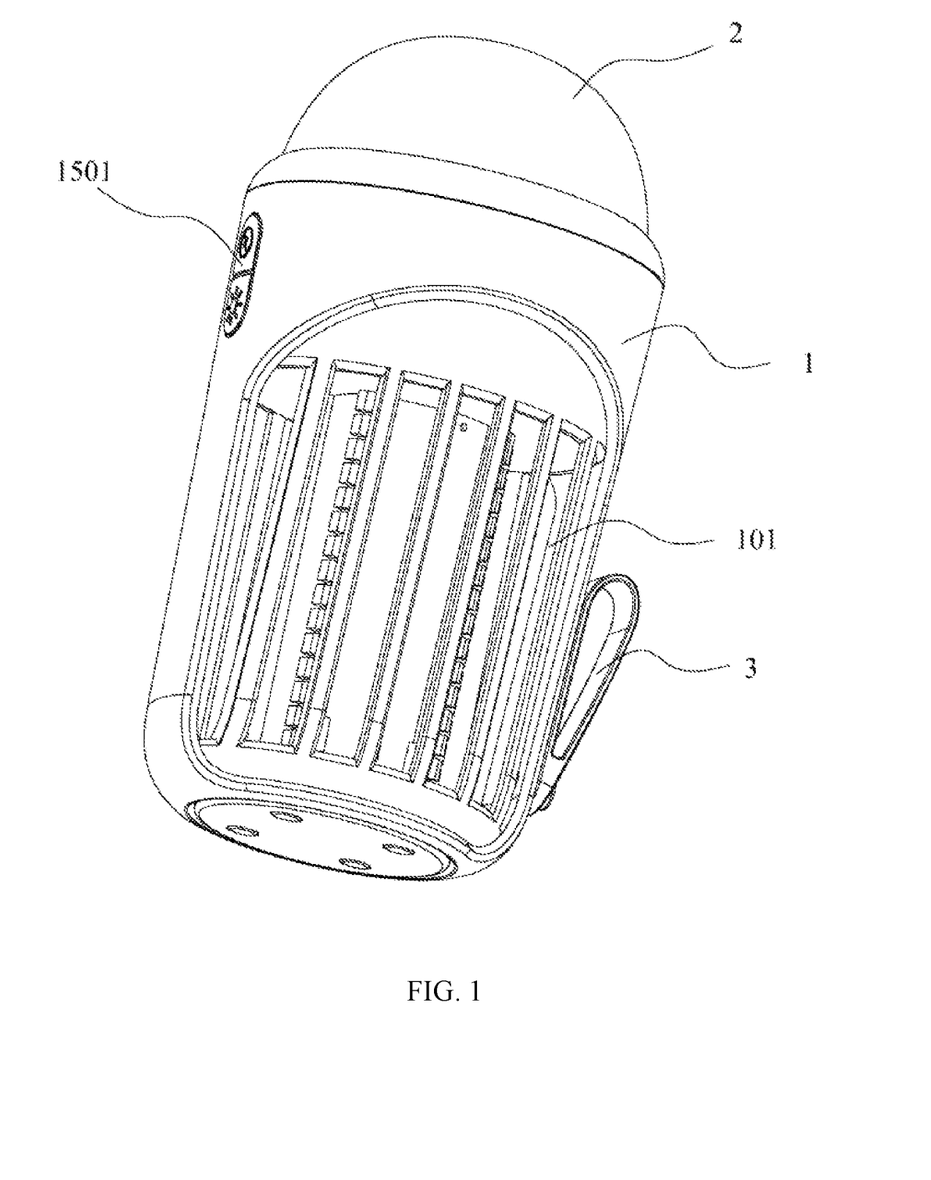
FIG. 1 is a schematic perspective view of a portable mosquito killing lamp of the present disclosure.
Figure 2:
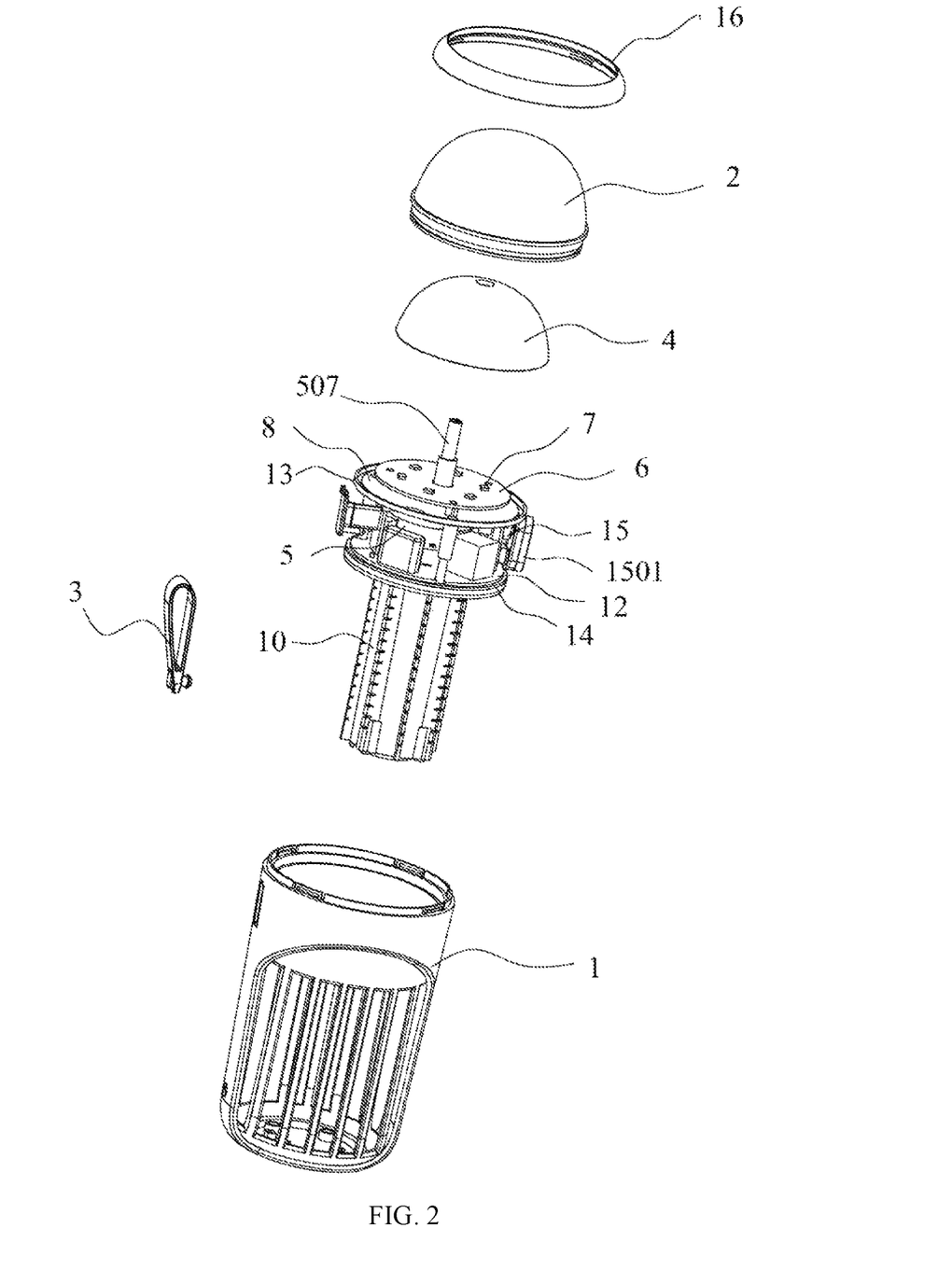
FIG. 2 is a schematic exploded view of the portable mosquito killing lamp of the present disclosure.
Figure 3:
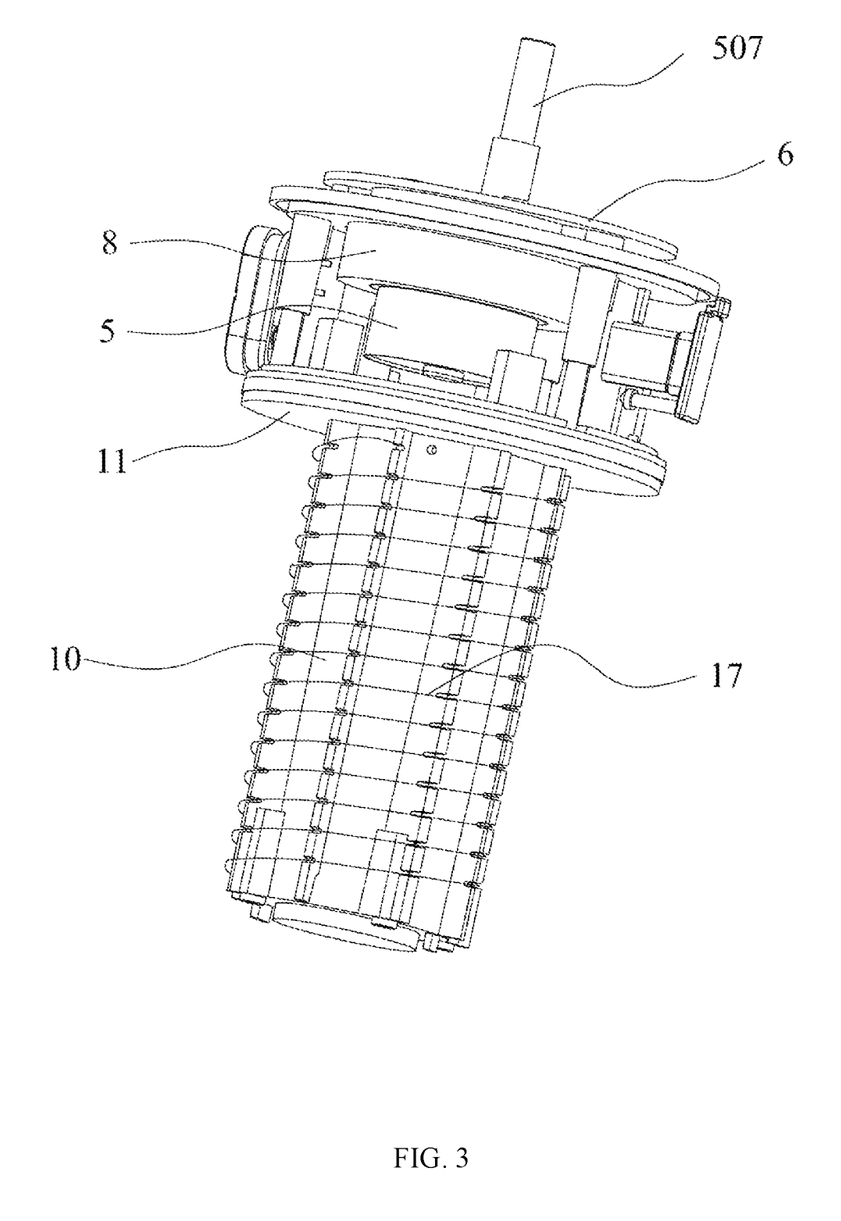
FIG. 3 is a schematic partial perspective view of the portable mosquito killing lamp of the present disclosure.

As shown in FIGS. 1-2, the present application discloses a portable mosquito killing lamp including a housing 1, a mosquito killing assembly, a light emitting assembly, and a lamp cover 2.

One end of the housing 1 is provided with an opening and the other end of the housing 1 is closed. A sidewall of the housing 1 close to the opening is provided with a plurality of through holes 101 arranged evenly along a circumferential direction of the housing 1. The through holes 101 communicate with an internal cavity of the housing 1, mosquitoes can pass through the through holes 101. The sidewall of the housing 1 is provided with a hanging ring 3.

The light emitting assembly includes an illuminant, a dazzling cover 4, and an actuator 5. The illuminant includes a substrate 6 and a plurality of light emitting members 7. A lighting control circuit 603 is disposed on the substrate 6, and the plurality of light emitting members 7 are annularly arranged at a periphery of the substrate 6. The light emitting members 7 are electrically connected to the lighting control circuit 603. The light emitting members 7 are LEDs, and the LEDs are controlled by the circuit to emit light of different colors. The actuator 5 includes a motor 501 and a gearbox 502, the motor 501 and the gearbox 502 are integrated. An input end of the gearbox 502 is connected to an output shaft of the motor 501, and an output end of the gearbox 502 is connected to a torque output shaft 507. An output shaft of the gearbox 502 is provided with a shaft sleeve 503, the torque output shaft 507 passes through the shaft sleeve 503 and is exposed out of the shaft sleeve 503. A step 504 is disposed on a sidewall of the actuator 5 and is located on a connection position of the motor 501 to the gearbox 502.

As shown in FIGS. 3 to 7, the housing 1 is provided with a connecting base 8, the connecting base is provided with a mounting groove 801. A bottom of the mounting groove 801 is provided with a mounting hole 802, and an internal cavity of the mounting groove 801 communicates with the internal cavity of the housing 1. The actuator 5 is embedded in the mounting groove 801, and an end portion of the actuator 5 (i.e., the part including the motor 501) extends through the mounting hole 802 into the housing 1, and a step surface of the step 504 abuts against the bottom of the mounting groove 801. The mounting groove 801 is eccentrically disposed on the connecting base 8, and the torque output shaft 507 is eccentrically disposed on the actuator 5, and the torque output shaft 507 is mounted coaxially with the connecting base 8. At least two connecting columns 803 are disposed on a sidewall of the connecting base 8, the actuator 5 is provided with lugs 505, the number of which is the same as that of the connecting columns 803, each lug 505 is provided with a fitting hole 506, the lugs 505 are mounted around the connecting columns 803. A central part of a substrate 6 of the illuminant is provided with a central hole 601, and the substrate 6 surrounds the shaft sleeve 803. The substrate 6 covers an opening of the mounting groove 801 and presses on an outside of the actuator 5, the substrate 6 is provided with first connecting holes 602 which are positioned corresponding to the connecting columns 803, each connecting hole 602 and a threaded hole of each connecting column 803 are passed through by a screw to fixedly connect the substrate 6 to the connecting columns 803.

Figure 8:
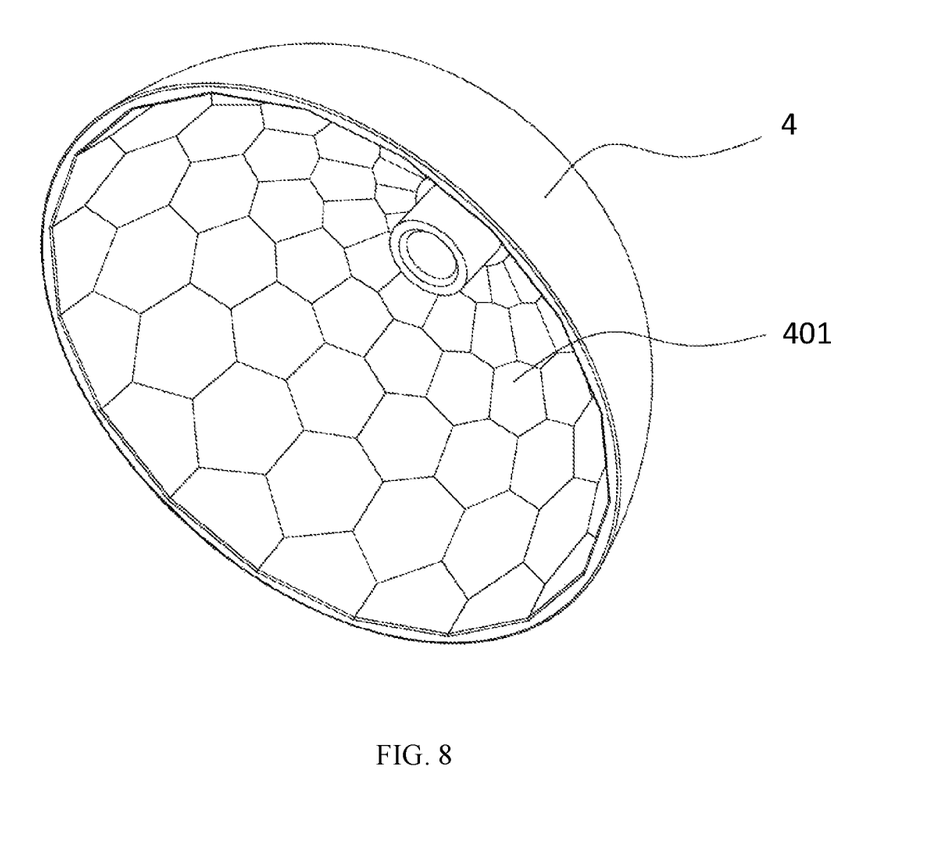
FIG. 8 is a schematic perspective view of the dazzling cover of the portable mosquito killing lamp of the present disclosure.

As shown in FIG. 8, the dazzling cover 4 is spherical shaped or partially spherical shaped, and an inner surface of the dazzling cover 4 is provided with a plurality of polygonal patterns 401. The polygonal patterns are arranged in sequence from the central part to the edge of the dazzling cover 4 and form loops, each loop is formed by a plurality of polygonal patterns 401 connected end to end along a circumferential direction. An outer surface of the dazzling cover 4 is smooth. A central part of the dazzling cover 4 is fixedly attached to an end portion of the torque output shaft 507, and the dazzling cover 4 covers the illuminant. The light emitted by the light emitting members 7 is refracted by the dazzling cover 4 to produce a dazzling effect. Specifically, the light passing through the dazzling cover 4 presents a colorful effect, and the light projected on an object can produce a pattern corresponding to the polygonal patterns of the dazzling cover 4. When the motor 501 works, the gearbox 502 rotates and drives the torque output shaft 507 to rotate, and thus the dazzling cover 4 connected to the torque output shaft 507 rotates together, which makes the colorful light passing through the dazzling cover 4 change accordingly.

Figure 4:
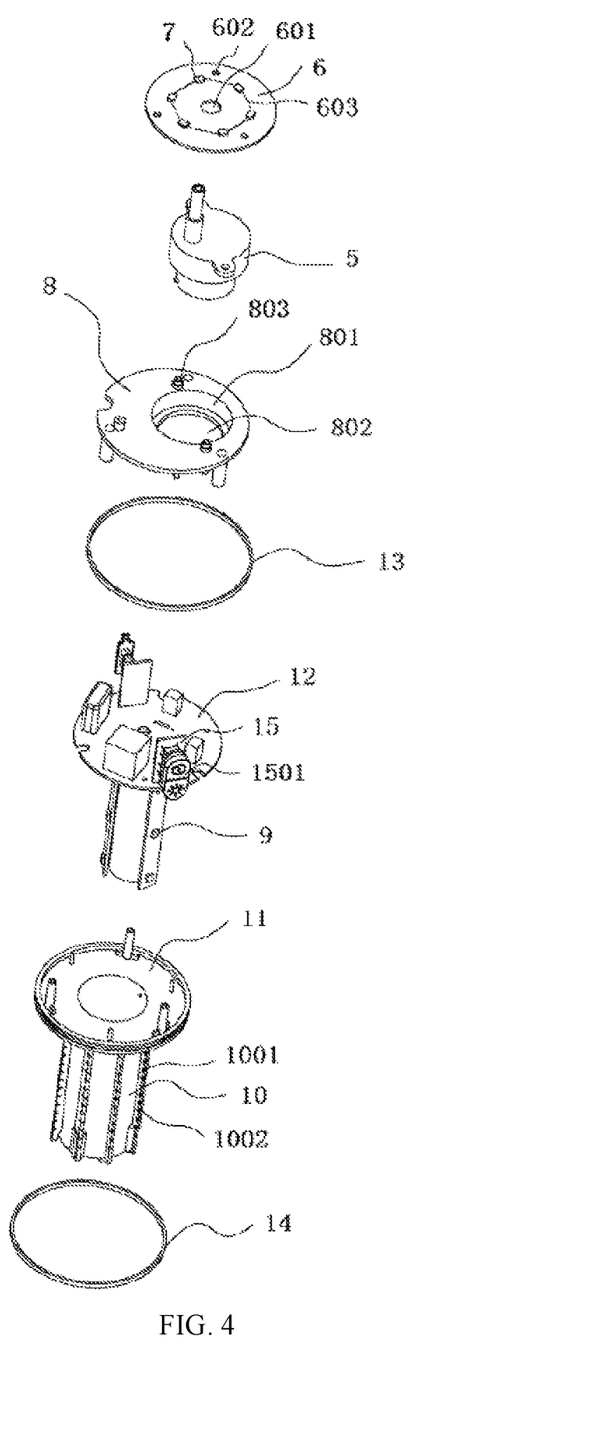
FIG. 4 is a schematic partially exploded view of the portable mosquito killing lamp of the present disclosure.
Figure 5:
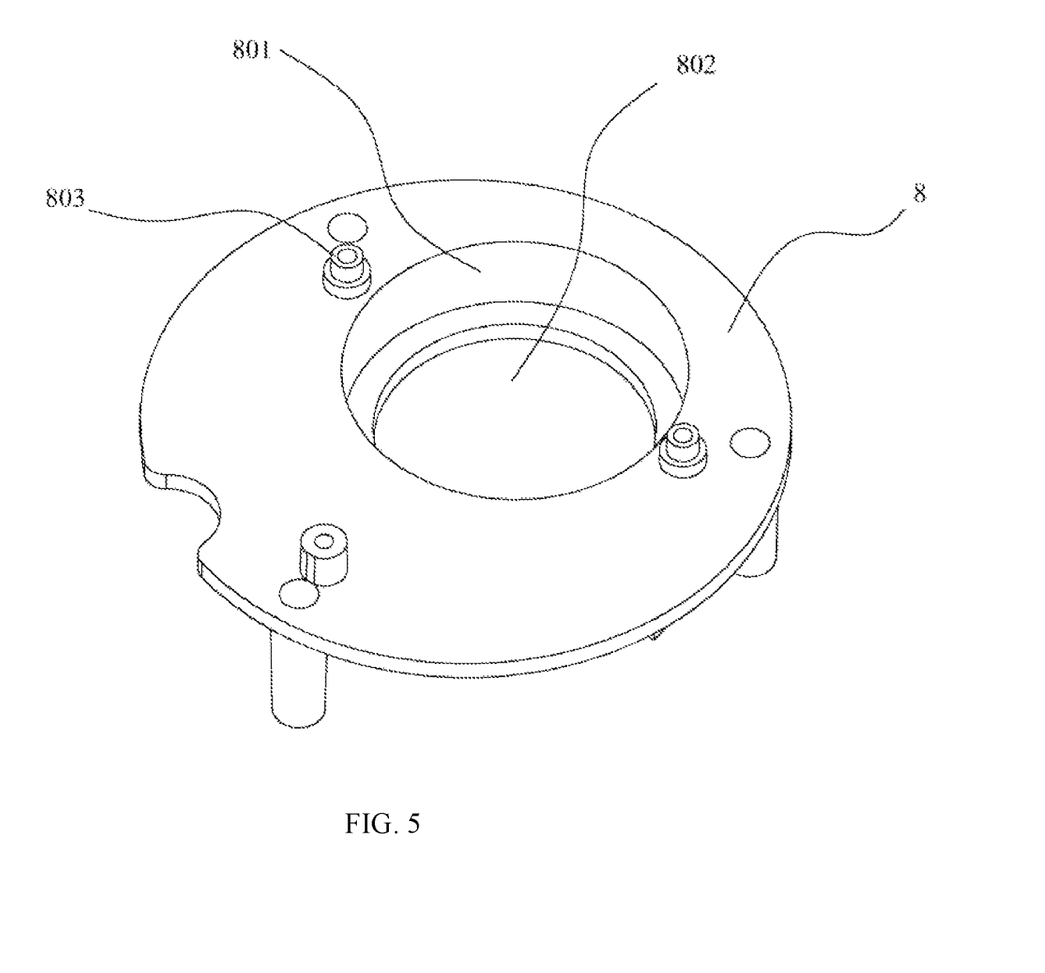
FIG. 5 is a schematic perspective view A of the connecting base of the portable mosquito killing lamp of the present disclosure.
Figure 6:
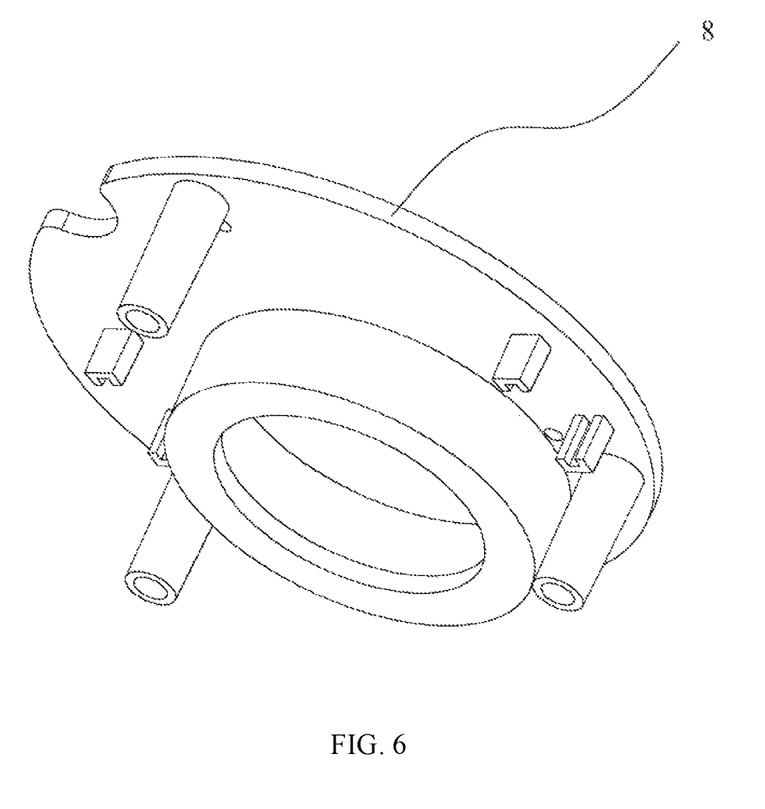
FIG. 6 is a schematic perspective view B of the connecting base of the portable mosquito killing lamp of the present disclosure.
Figure 7:
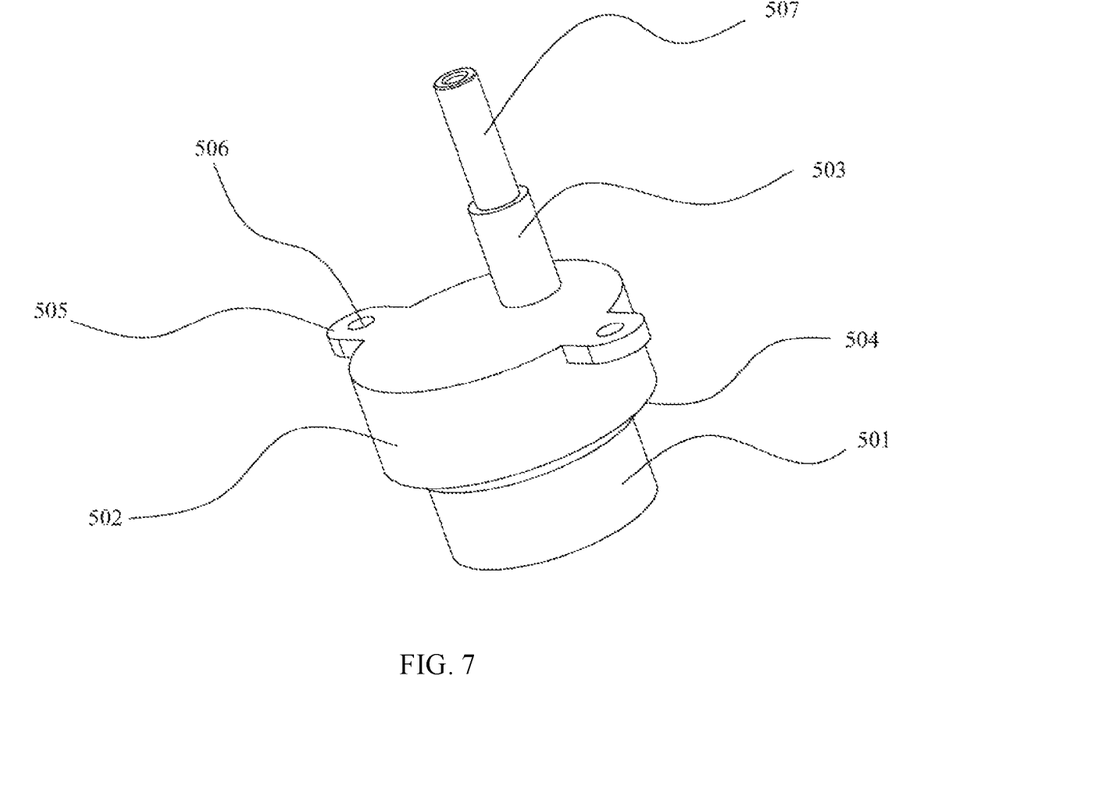
FIG. 7 is a schematic perspective view of the actuator of the portable mosquito killing lamp of the present disclosure.

The mosquito killing assembly includes an electrical mesh 17, a mosquito attracting lamp 9 and a mosquito killing control circuit. A supporting column 10 is arranged within the housing 1, and the supporting column 10 is made of transparent material. One end of the supporting column 10 is fixedly connected to an inner wall of the closed end of the housing 1 and the other end of the supporting column 10 is provided with an opening. The end with the opening of the supporting column 10 is close to the end with the opening of the housing 1. An end surface of the end with the opening of the supporting column 10 is provided with an annular supporting plate 11, and the annular supporting plate 11 is integrally formed with the supporting column 10. A plurality of ribs 1001 are disposed on a sidewall of the supporting column 10 and are arranged circumferentially along the supporting column 10, each of the ribs 1001 is provided with a plurality of grooves 1002 along a length direction of the ribs 1001. The electrical mesh 17 is wound around the ribs 1001, and the electrical mesh 17 is electrically connected to the mosquito killing control circuit. The mosquito attracting lamp 9 is mounted in the supporting column 10, the mosquito attracting lamp 9 is connected to the mosquito killing control circuit. The annular supporting plate 11 is fixedly connected to a control board 12, the control board 12 covers the opening of the supporting column 10, the control board 12 is provided with a control circuit, and the mosquito killing control circuit is also integrated into the control board 12.

The connecting base 8 is fixedly connected to the annular supporting plate 11. The connecting base is accommodated inside the end with the opening of the housing 1, a peripheral wall of the connecting base 8 and an inner wall of the housing 1 are in sealed connection through a first sealing ring 13, and a peripheral wall of the annular supporting plate 11 and the inner wall of the housing 1 are in sealed connection through a second sealing ring 14. A closed space is formed between the connecting base 8 and the annular supporting plate 11 through the first sealing ring 13 and the second sealing ring 14. Electronic components of the control board 12 are accommodated in the closed space. The actuator 5 and the lighting control circuit 603 are electrically connected to the control circuit on the control board 12. A switch 15 is mounted on the control board 12, and a mounting hole 802 for the switch 15 is disposed on the sidewall of the housing 1. A button 1501 of the switch 15 passes through the mounting hole 802 for the switch 15 and is exposed out of the housing 1.

A retaining ring 16 is mounted around an open end of the lamp cover 2 and an end portion of the lamp cover 2 is limited within the retaining ring 16. The retaining ring 16 is releasably connected to the end with the opening of the housing 1 through snap-fitting, and the lamp cover 2 covers the opening of the housing 1 so that the light emitting assembly is accommodated within a space formed between the housing 1 and the lamp cover 2.

When the portable mosquito killing lamp disclosed by the present application is in use, the switch 15 may control the mosquito killing assembly, as well as the light emitting assembly, and when the light emitting assembly is turned on, the light from the illuminant is refracted by the dazzling cover 4 and the lamp cover 2 to produce a dazzling effect.

The invention claimed is:

1. A portable mosquito killing lamp comprising:
a housing; and
a lamp cover connected to the housing,
wherein a mosquito killing assembly and a light emitting assembly are arranged on the housing, the light emitting assembly comprises an illuminant and a dazzling cover, the illuminant and the dazzling cover are connected to the housing and are disposed between the housing and the lamp cover, and the dazzling cover covers the illuminant and is disposed inside the lamp cover.

2. The portable mosquito killing lamp according to claim 1, wherein the dazzling cover is provided with a pattern producing a dazzling effect.

3. The portable mosquito killing lamp according to claim 2, wherein the pattern is formed by a plurality of polygonal patterns connected one another.

4. The portable mosquito killing lamp according to claim 2, wherein the pattern is disposed on an inner surface of the dazzling cover, and an outer surface of the dazzling cover is smooth.

5. The portable mosquito killing lamp according to claim 2, wherein a connecting base is arranged on the housing, the illuminant is mounted on the connecting base, an actuator is further mounted on the connecting base, the dazzling cover is connected to a torque output shaft of the actuator; the illuminant and the actuator are accommodated within a receiving space formed between the connecting base and the lamp cover.

6. The portable mosquito killing lamp according to claim 5, wherein the mosquito killing assembly is accommodated within a receiving space formed between the connecting base and the housing; a plurality of through holes are disposed on a sidewall of the housing, the through holes communicate with an internal cavity of the housing; a supporting column and a control board are disposed in the housing; the mosquito killing assembly comprises an electrical mesh wrapped around the supporting column, and the electrical mesh is electrically connected to the control board.

7. The portable mosquito killing lamp according to claim 6, wherein the supporting column is fixedly connected to the housing, the connecting base is fixedly connected to an end portion of the supporting column; and the control board is mounted between the connecting base and the supporting column.

8. The portable mosquito killing lamp according to claim 6, wherein the mosquito killing assembly comprises a mosquito attracting lamp disposed within the supporting column, the mosquito attracting lamp is electrically connected to the control board; and the supporting column is made of a transparent material.

9. The portable mosquito killing lamp of claim 6, wherein a retaining ring is mounted around an open end of the lamp cover, an end portion of the lamp cover is limited within the retaining ring, and the retaining ring is connected to an end portion of the housing.

10. The portable mosquito killing lamp according to claim 5, wherein the connecting base is provided with a mounting groove, and the actuator is embedded in the mounting groove; the illuminant covers an opening of the mounting groove, and the torque output shaft passes through the illuminant and is exposed out of the illuminant; a central portion of the dazzling cover is fixedly connected to an end portion of the torque output shaft and the dazzling cover covers the connecting base.

11. The portable mosquito killing lamp according to claim 10, wherein the actuator is provided with a shaft sleeve, the torque output shaft passes through the shaft sleeve and is exposed out of the actuator; a central part of a substrate of the illuminant is provided with a central hole, and the substrate surrounds the shaft sleeve.

12. The portable mosquito killing lamp according to claim 11, wherein the illuminant further comprises a plurality of light emitting members, the substrate is provided with a lighting control circuit, the plurality of light emitting members are annularly arranged at a periphery of the substrate, the light emitting members are electrically connected to the lighting control circuit.

13. The portable mosquito killing lamp according to claim 10, wherein a bottom of the mounting groove is provided with a mounting hole, an internal cavity of the mounting groove communicates with an internal cavity of the housing; a step is disposed on a sidewall of the actuator, an end portion of the actuator extends through the mounting hole into the housing, a step surface of the step abuts against the bottom of the mounting groove.

14. The portable mosquito killing lamp according to claim 13, wherein the mounting groove is eccentrically disposed on the connecting base; the torque output shaft is eccentrically disposed on the actuator; and the torque output shaft is mounted coaxially with the connecting base.

15. The portable mosquito killing lamp according to claim 13, wherein the connecting base is provided with at least two connecting columns, the actuator is provided with fitting holes, a number of which is the same as a number of the connecting columns, and the actuator is mounted around the connecting columns; and the illuminant presses on an outside of the actuator and the illuminant is fixedly connected to the connecting columns.

\* \* \* \* \*